No. 755,235. PATENTED MAR. 22, 1904.
H. O'DONNELL & W. C. SOUTH.
CAMERA.
APPLICATION FILED SEPT. 28, 1903.
NO MODEL. 2 SHEETS—SHEET 1.
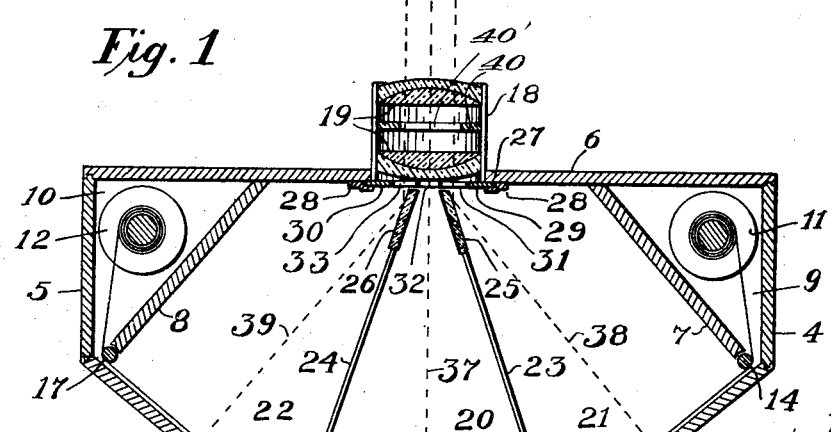
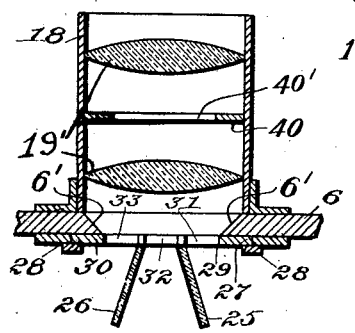
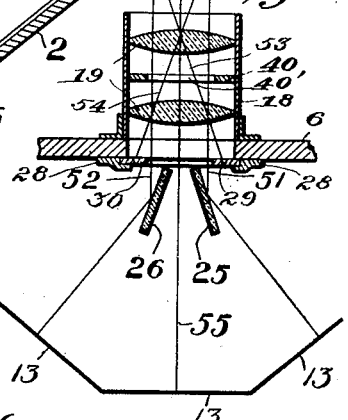
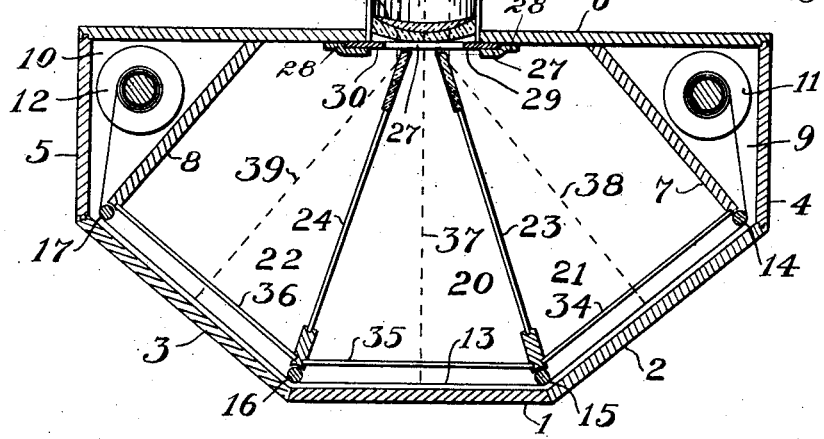
WITNESSES:
Utley E. Crane Jr
Nina E. Burke
INVENTORS
Hugh O'Donnell
Wm. C. South
BY
Chas. N. Butler
ATTORNEY.

Fig. 5.
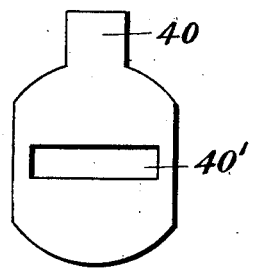
Fig. 5ᵃ.
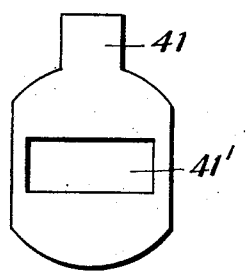
Fig. 5ᵇ.
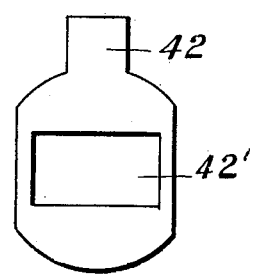
Fig. 6.
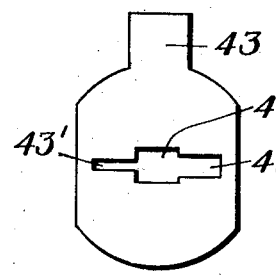
Fig. 6ᵃ.
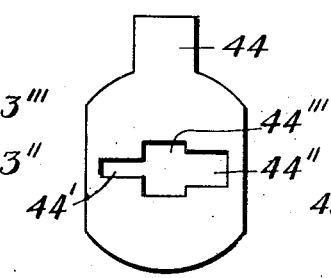
Fig. 6ᵇ.
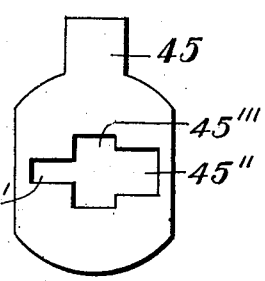
Fig. 7.
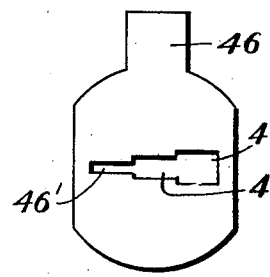
Fig. 7ᵃ.
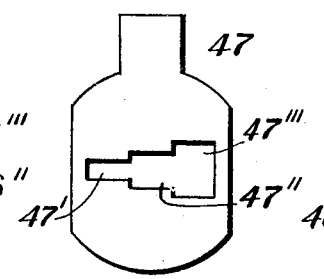
Fig. 7ᵇ.
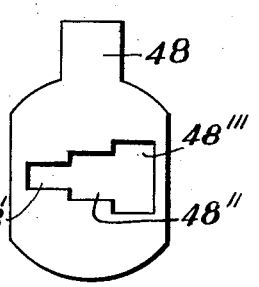

No. 755,235. Patented March 22, 1904.

UNITED STATES PATENT OFFICE.

HUGH O'DONNELL, OF PITTSBURG, AND WILLIAM C. SOUTH, OF BERWYN, PENNSYLVANIA.

CAMERA.

SPECIFICATION forming part of Letters Patent No. 755,235, dated March 22, 1904.

Application filed September 28, 1903. Serial No. 174,909. (No model.)

*To all whom it may concern:*

Be it known that we, HUGH O'DONNELL, residing at Pittsburg, county of Allegheny, WILLIAM C. SOUTH, residing at Berwyn, and county of Chester, State of Pennsylvania, have jointly invented certain Improvements in Cameras, of which the following is a specification.

This invention relates to cameras having means for producing simultaneously a plurality of negatives of the same object. Its chief purpose is to provide a polygraph-camera adapted for simultaneously producing by a single lens three images of the same object of substantially the same intensity and at substantially equal distances from the optical center of the lens without the use of the costly and not-readily-adjustable prisms with reducers and focal-distance regulators heretofore required.

A further object is to provide a simple, inexpensive, compact, and readily-adjustable camera of the character described adapted for the use of color-screens and films, by which negatives suitable for use in color-photography may be obtained.

An additional object is to regulate the admission and control the dispersion of the light-rays, to avoid light interferences, to prevent blurring of the images, and to save waste of film.

The nature and characteristic features of the improvements will more fully appear by reference to the following description and the accompanying drawings in illustration thereof, of which—

Figure 1 represents a horizontal sectional view of a camera embodying the invention. Fig. 2 represents a similar view of a modified form of construction made in accordance with the improvements. Fig. 3 represents a sectional view of details, showing further variations of construction. Fig. 4 is a diagrammatic representation of the action of the light-rays, and Figs. 5, $5^a$, $5^b$, 6, $6^a$, $6^b$, 7, $7^a$, and $7^b$ represent stops which may be employed in the improvements.

Referring to the drawings, the camera-box comprises the back walls 1, 2, and 3, the doors 4 and 5, and the front wall 6. It contains the partitions 7 and 8, which form the chambers 9 and 10 for holding the film-rolls 11 and 12, the film 13 being drawn over rollers 14, 15, 16, and 17 at the angles of the back walls. The interior, bound by the back walls, front wall, and film-chamber partitions, is provided with the lens-tube 18, containing the lenses 19, and is divided into three chambers 20, 21, and 22 by the non-actinic partitions 23 and 24, which converge from the angles between the back walls toward the lens-tube and carry mirrors 25 and 26, arranged to divide the light passing the lens, the mirrors reflecting the lateral rays and throwing them upon the sensitized surfaces or sections of film held at right angles thereto in the rear of the lateral compartments 21 and 22, while the central rays impinge directly on the sensitized surface or film-section held at right angles thereto in the rear of the central compartment 20. It has been found that mirrors suitable for this purpose may be produced by grinding or etching and blackening to render non-actinic the back of a glass plate. The more usual forms of mirrors have been found unsatisfactory, as they produce double images, fogs, and blurs. Mirrors of polished glass of non-actinic color—such as black, red, and orange—may be employed, (without etching or frosting,) as also polished metal, hard rubber, and like substances susceptible of taking a highly-polished reflecting-surface. To prevent light passing through the lens from striking directly on the film in the lateral chambers, thereby destroying the reflected image, the outside rays are cut off by an apertured plate or slide 27, held by the guides 28 against the front board 6 and having its sides 29 and 30 overlapping the outer parts of the lens. The front board may have the flange 6' projecting into the bore of the tube, so as to overlap the periphery of the lens 19', or such periphery may be blackened to cut off the outside rays. The light-apertures in the plate 27 may contain the color-screens 31, 32, and 33, held across the entrance to the several chambers. The light may also be filtered by color-screens 34, 35, and 36, movably seated in the partitions of the respective chambers adjacent to the sensitized surfaces or film-sections therein. In some cases it may be desirable to use the two sets of filters or screens simultaneously in the positions described—as, for instance, with pale filters in outdoor work and bright light, while with indoor work and subdued light but one set may be used. This arrangement of filters by which either one or more may be used in each compartment permits the regulation of the exposure of each of the several film-sections or the sensitized plates, which may be substituted therefor. To further control the light-rays, there are employed stops having apertures designed to suit various conditions. In simultaneously exposing three sensitized surfaces or film-sections with filters adjusted so that the time exposures for the several colors (violet, green, and red orange) would be the same, the stops 40, 41, and 42, having the respective regular oblong apertures 40′, 41′, and 42′, would serve for the various light conditions; but with filters having different exposure ratios in order to regulate the light passing through the respective filters to correspond with the exposure ratios there may be employed the stops 43, (with aperture-sections 43′ 43″ 43‴,) 44, (with aperture-sections 44′ 44″ 44‴,) and 45, (with aperture-sections 45′ 45″ 45‴,) or stops 46, (with aperture-sections 46′ 46″ 46‴,) 47, (with aperture-sections 47′ 47″ 47‴,) and 48, (with aperture-sections 48′ 48″ 48‴.) It will be understood that these irregular rectangular apertures have the areas of their several sections related in the ratios of the light-filters employed and are of the several sizes required for varying light conditions. It will be seen that this construction provides for the admission of light-rays, as 51 and 52, which pass through the lens, so as to impinge upon the mirrors 25 and 26 and be thrown thereby upon the sensitized surfaces in the rear of the lateral compartments at right angles to the paths of such reflected rays, while direct rays, as 53 and 54, are cut off therefrom. The rays, as 55, passing into the central compartment, impinge directly and form a direct image on the sensitized surface extending across their path in the rear of said compartment.

The expression "frosted" as used in the claims is to be understood as a surface that has been ground, etched, sandblasted, or otherwise treated for producing the peculiar condition which avoids the reflection of a double image or a haze interfering with a single image.

Having described our invention, we claim—

1. In a camera, in combination with a lens, a plurality of non-actinic reflectors dividing the light passing through said lens, and mechanism for holding a sensitized surface across the path of the light reflected from each of said reflectors, substantially as specified.

2. A camera having a plurality of chambers, a lens communicating with said chambers, mirrors oblique to and dividing the light passing through said lens, and mechanism for holding a sensitized surface in the respective chambers in the paths of the reflected and direct light from said lens, substantially as specified.

3. A camera having a plurality of chambers, a lens communicating with said chambers, and a non-actinic reflector dividing the light passing through said lens, substantially as specified.

4. In a camera, a lens, in combination with a mirror comprising a glass plate having a frosted, non-actinic back, substantially as specified.

5. In a camera, a lens, in combination with a mirror comprising a glass plate having its back ground and blackened, substantially as specified.

6. In a camera, a compartment, a plurality of partitions dividing said compartment into separate chambers, a lens-tube communicating with said chambers, mirrors in said partitions receiving rays of light passing through said tube, and screens in the path of said light-rays, substantially as specified.

7. In a camera, a lens, in combination with a mirror, mechanism adapted for passing a film across the path of the direct and reflected rays from said lens, and means for simultaneously exposing sections of said film to direct and reflected rays from said lens, substantially as specified.

8. In a camera, a lens or lenses, in combination with a compartment divided into a plurality of chambers arranged to receive light from said lens or lenses, mechanism for holding sections of a film in the rear of said compartment, and mirrors for reflecting light entering lateral chambers of said compartment, substantially as specified.

9. In a camera, a lens, a mirror disposed to divide the light passing through said lens, and means for preventing interference with said mirrored rays by direct rays passing through said lens, substantially as specified.

10. In a camera, a lens, a mirror disposed to divide light passing through said lens, in combination with an apertured stop having light-sections of varied size, and light-filters to whose ratios the sizes of said sections are adjusted, substantially as specified.

11. In a camera, a lens, in combination with a chamber disposed to receive light from said lens, a mirror disposed to reflect said light, a screen disposed between said lens and mirror, and means for cutting off the direct rays passed by said lens and disposed to interfere with said reflected rays, substantially as specified.

12. In a camera, a lens, in combination with a chamber disposed to receive light from said lens, a mirror disposed to reflect said light, and a slide disposed between said lens and mirror for cutting off rays disposed to interfere with rays reflected by said mirror, substantially as specified.

13. In a camera, a lens, in combination with mirrors disposed in the path of light passing from said lens, a slide for cutting off interfering rays, mechanism for holding a sensitized surface disposed to receive light reflected by said mirrors, and color-screens disposed between said lens and mirrors, substantially as specified.

In testimony whereof we have hereunto set our hands, this 23d day of September, A. D. 1903, in the presence of the subscribing witnesses.

HUGH O'DONNELL.
    WM. C. SOUTH.

Witnesses:
 E. C. South,
 W. L. Holding.